United States Patent [19]

Yoshino et al.

[11] Patent Number: 5,037,713
[45] Date of Patent: Aug. 6, 1991

[54] SECONDARY BATTERY

[75] Inventors: Masaki Yoshino; Sachiko Yoneyama, both of Yokohama; Okitoshi Kimura, Tokyo; Toshiyuki Ohsawa, Kawasaki; Toshiyuki Kabata, Yokohama, all of Japan

[73] Assignee: Ricoh Company, Ltd., Tokyo, Japan

[21] Appl. No.: 495,144

[22] Filed: Mar. 19, 1990

[30] Foreign Application Priority Data

Mar. 23, 1989 [JP] Japan ................................... 1-69303

[51] Int. Cl.$^5$ ...................... H01M 4/60; H01M 10/40
[52] U.S. Cl. .................................... 429/192; 429/197; 429/213; 429/218
[58] Field of Search .............. 429/197, 196, 194, 218, 429/213, 191, 192, 199

[56] References Cited

U.S. PATENT DOCUMENTS

| | | | |
|---|---|---|---|
| 3,981,743 | 9/1976 | Schaefer | 429/218 |
| 4,056,885 | 11/1977 | Rao | 429/218 X |
| 4,728,589 | 3/1988 | MacDiarmid et al. | 429/213 |
| 4,804,597 | 2/1989 | Tahara et al. | 429/197 |
| 4,840,858 | 6/1989 | Furukawa et al. | 429/197 |
| 4,865,932 | 9/1989 | Masuda et al. | 429/194 |
| 4,906,538 | 3/1990 | Toyosawa et al. | 429/197 |

Primary Examiner—Anthony Skapars
Attorney, Agent, or Firm—Oblon, Spivak, McClelland, Maier & Neustadt

[57] ABSTRACT

A non-aqueous secondary battery comprises (i) an electroconductive or semiconductive polymeric material serving as an active material for a positive electrode, (ii) a negative electrode active material and (iii) an electrolytic solution comprising an electrolyte and a mixed solution of γ-butyrolactone and a glyme. This secondary battery can be fabricated in the form of a flexible sheet.

20 Claims, 2 Drawing Sheets

SECONDARY BATTERY

BACKGROUND OF THE INVENTION

1. The Field of the Invention

The present invention relates to a secondary battery, and more particularly, to a non-aqueous secondary battery using an electroconductive or semiconductive polymeric material as a positive electrode active material.

2. Discussion of Background

It is conventionally known that polymeric materials such as polypyrrole, polythiophene, polyphenylene and polyaniline, which are insulating or semiconductive materials themselves, become electroconductive just like metals by doping impurities therein, as disclosed in A.F. Dinz. J. Chem. Soc., Chem. Commun., 1975. 635; Japanese Laid-Open Patent Application 56-47421; Electrochem., Acta., 27, 61 (1982); and F. Diaz. J. Electroanal. Chem. 111. 1524 (1980). The above-mentioned doping can be carried out reversibly, accompanied with color change, so that research and development activities are now being directed to the application of the above polymeric materials, for example, in the field of a display device, a secondary battery, an electromagnetic shielding material and a variety of sensors.

In line with the trend toward small-size, light-weight electronic devices, the thinning and lightening of the batteries used as power sources for these devices has become an important research subject. Therefore, the application of the above polymeric materials to a light, small and thin secondary battery is particularly expected. Because the secondary batteries using the above polymeric materials as electrode active materials show high energy density and are more flexible than conventional batteries employing conventional active materials. The aforementioned polymeric materials can be used as positive electrode active materials of non-aqueous secondary batteries, because doping and dedoping can be carried out in a non-aqueous solution.

In addition, the need for a battery with large energy capacity has become evident, and alkaline batteries from which high voltage can be gained have been developed in recent years.

A secondary battery comprising an alkali metal such as Li and Na serving as a negative electrode active material, and the above-mentioned polymeric material serving as a positive electrode active material is thus expected to have high energy density.

However, the above-mentioned alkali metal battery employing an electroconductive polymeric material as a positive electrode active material is put into practice only as a coin-type battery. With such circumstances taken into consideration, it is said that the advantages of the above-mentioned polymeric materials are not effectively utilized in the secondary battery at present. In other words, a light, flexible sheet-shaped secondary battery having an increased surface area has not been realized yet.

In the battery using the electroconductive polymeric material as an active material for the positive electrode, smooth doping and dedoping is closely connected with the improvement in the characteristics of the battery. The doping and dedoping action is considered to be determined by the interaction between the employed electrolytic solution and polymeric active material. In other words, the electrolytic solution significantly affects the performance of the polymeric active material.

In the light of the above-mentioned interaction between the electrolytic solution and polymeric active material, an electrolytic solution capable of smoothly conducting the doping-dedoping reaction of the electroconductive polymeric active material is required in order to obtain a secondary battery having a large energy capacity and a high electric current density during the charging and discharging operation.

On the other hand, since the compatibility of the electrolytic solution with the negative electrode material is also important, the electrolytic solution which does not have adverse influences upon the negative electrode must be selected.

As for the materials of the negative electrode, alkali metals including lithium in particular have been actively studied in order to obtain batteries having high energy density. However, when lithium is used as the negative electrode active material of the secondary battery, a reaction product of lithium and an electrolytic solution, which has not yet clarified, is unfavorably deposited in the form of dendrite or moss on the negative electrode, or lithium is finely divided in the course of doping and dedoping action. This will shorten the cycle life of a battery. It is confirmed that the frequency of the occurrence of the above phenomena varies depending on the types of the electrolytic solution. Therefore it is necessary to choose a proper electrolytic solution for the negative electrode material, which has no potentialities to induce the above phenomena, in order to obtain the secondary battery having a prolonged cycle life.

Conventionally, propylene carbonate (PC) is mainly used as a prime solvent of an electrolytic solution of the secondary battery. This is because the propylene carbonate based electrolytic solution can actually attain high stability and reliability when used in a primary battery. However, the solubility of an electrolyte in the propylene carbonate based electrolytic solution is poor, so that the highly-concentrated electrolytic solution cannot be obtained. In addition to the above, the solution viscosity of the propylene carbonate based electrolytic solution is so high that it is difficult to cause this electrolytic solution to penetrate into a separator when a second battery including a separator is prepared.

As is apparent from the above, the electrolytic solution of the secondary battery which matches very well with both the positive electrode active material and negative electrode active material is a key point to prepare a secondary battery having a large energy capacity, high electric current density in the charging and discharging operation and has a prolonged cycle life.

SUMMARY OF THE INVENTION

Accordingly, an object of the present invention is to provide an improved secondary battery comprising a polymeric material serving as a positive electrode active material and a negative electrode active material, which battery shows a large energy capacity and high current density in charging and discharging, and a prolonged cycle life.

The above-mentioned object of the present invention can be achieved by a secondary battery comprising (i) an electroconductive or semiconductive polymeric material serving as a positive electrode active material, (ii) a negative electrode active material and (iii) an electrolytic solution comprising a mixed solvent of γ-butyrolactone and a glyme and an electrolyte dissolved therein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In the secondary battery according to the present invention, a mixture of γ-butyrolactone and a glyme is used as a solvent of an electrolytic solution, in which an electrolyte can be dissolved at high concentration even in the course of a discharging operation.

A prime solvent of an electrolytic solution used in the secondary battery according to the present invention is γ-butyrolactone. The density of γ-butyrolactone is 1.124 g/cm$^3$, which is considered to be relatively low when compared with conventionally employed propylene carbonate having a density of 1.203 g/cm$^3$. Accordingly, a light-weight secondary battery can be realized. In addition to this, γ-butyrolactone shows a low solution viscosity, which contributes to increasing the solubility of the employed electrolyte therein and decreasing the resistivity thereof.

The electrolytic solution comprises an electrolyte and a solvent. For example, when various electrolytes are practically dissolved in a mixed solvent of dimethyl sulfoxide and dimethoxy ethane at a mixing ratio of 50:50 (vol%), it is confirmed that the maximum electrical conductivity of the electrolytic solution can be obtained when the concentration of the electrolyte is about 1 mol/l or less as described in Electrochimica Acta. Vol. 32, No. 2, pp.299-305 (1987) printed in Great Britain. In the case where the electrolytic solution is used in the secondary batter employing the polymeric active material for the positive electrode, however, sufficient replenishment of a dopant is required when doping (or dedoping) of an anion into (or from) the positive electrode proceeds in the course of charging and discharging operations. With the above conditions taken into consideration, 3 mmol or more, more preferably 3.5 mmol or more, of the electrolyte per gram of the polymeric material for the positive electrode may be present in the electrolytic solution during the discharging operation.

The optimal amount of the electrolyte varies depending on the types of the electroconductive polymeric material. For example, when polypyrrole is used as the positive electrode polymeric active material, it can constantly produce an electric energy at 80 to 100 mAh/g. To output the above-mentioned energy 3 mmol or more of the electrolyte is necessary. In the case of polyaniline, 3.7 mmol or more of the electrolyte is required to cause polyaniline to output the constant energy at about 100 to 140 mAh/g.

The above amount of each electrolyte is determined only by the electroconductive polymeric material. In practice, however, an additional amount of the electrolyte is required to prevent the electroconductivity of the electrolytic solution from drastically decreasing during the charging operation. To keep the electroconductivity of the electrolytic solution, it is preferable that the above-mentioned additional amount ratio of the electrolyte to the electrolytic solution be in the range of 0.1 to 1.5 mol/l in the secondary battery.

As mentioned previously, since the concentration of the electrolytic solution is increased, the viscosity thereof is also apt to increase in the secondary battery which comprises the electroconductive polymeric material. By using γ-butyrolactone as a prime solvent of the electrolytic solution, the viscosity of the electrolytic solution can be decreased and the solubility of the electrolyte therein can be increased to some degree, which will be accompanied by the effective doping action. The electrolytic solution in which γ-butyrolactone is used alone as a solvent is unfavorably unstable and assumes a color when heated to around 40° C. or stored for a long period of time. It is considered that this coloration results from the decomposition of the solvent or electrolyte employed. This will cause the second battery to deteriorate.

In the present invention, when one or two low-density glymes are added to the aforementioned γ-butyrolactone to prepare a solvent of an electrolytic solution, the solution viscosity and the density can be decreased, and the stability of the electrolytic solution and the solubility of an electrolyte therein can be increased, so that a light-weight secondary battery can be realized.

The above-mentioned term "glymes" means solvents containing an oxyethylene chain therein. Examples of the above glymes for use in the present invention are 1,2-dimethoxy ethane, diethylene glycol methyl ether, triethylene glycol dimethyl ether, 1,2-ethoxy methoxy ethane, 1,2-dimethoxy ethane and tetraethylene glycol dimethyl ether.

It is preferable to use unsym-glymes represented by the following formula in which R$^1$ and R$^2$ are different are used together with γ-butyrolactone as a solvent of the electrolytic solution, since the stability of the electrolytic solution is further increased, and no coloration and thickening proceed with time.

wherein R$^1$ and R$^2$ independently represent an alkyl group having 1 to 4 carbon atoms; and n is an integer of 1 to 7.

Among the above listed glymes, 1,2-ethoxy methoxy ethane, which is given as a representative example of the above unsym-glymes, is particularly optimal for a solvent of an electrolytic solution for use in the present invention.

It is preferable that the amount ratio of the glyme to γ-bulyrolactone be in the range of 20 to 80 vol%.

Within this range, exothermic and coloring changes of the solvent do not take place and the stability thereof can be maintained. The density of the above unsymglyme, 1,2-ethoxy methoxy ethane is as low as 0.8683 g/cm$^3$, so that the weight of the electrolytic solution can be thus remarkably decreased. Even though a high-molecular weight electrolyte such as CF$_3$SO$_3$Li is employed, low density glymes can decrease the total weight of the electrolytic solution and high energy density can be thus realized. By virtue of a mixed solvent of $\gamma$-butyrolactone and the above-mentioned glyme, a highly concentrated electrolytic solution is obtained, which satisfies the conditions such as low resistivity, low viscosity, high ion-conductivity and safety at the same time.

In the present invention, since the above mixed solvent is employed in the electrolytic solution of the secondary battery, the resistivity of the solution can be decreased, which can also decrease the impedance in the battery. Therefore, the charging and discharging operation can be carried out at a large quantity of electric current when the secondary battery according to the present invention is used.

In addition, the electrolytic solution for use in the present invention can be smoothly penetrated into a material of a separator or an electroconductive polymeric material because the solution viscosity thereof is decreased.

Examples of the electrolyte for use in the present invention are LiBF$_4$, LiAsF$_6$, CF$_3$SO$_3$Li, LiSbF$_6$, LiPF$_6$, LiClO$_4$, Mg(ClO$_4$)$_2$ and NaClO$_4$. Among them, CF$_3$SO$_3$Li is preferable from the viewpoint of safety, and LiBF$_4$ and LiPF$_6$ are preferable from the viewpoint of lightening of the total weight of a battery.

The electroconductive or semiconductive polymeric materials for the positive electrode in the present invention can be prepared by polymerization of monomers such as pyrrole, thiophene, furan, benzene, azulene, aniline, diphenylbenzidine, diphenylamine, triphenylamine and derivatives thereof, for instance, by electrochemical polymerization thereof. Simultaneously with polymerization, the thus prepared polymeric materials form a complex together with an anion of the electrolyte and doping and dedoping of the anion takes place with the progress of redox reaction. Those polymeric materials are provided with high electric conductivity by means of electrochemical doping, and at the same time, energy can be stored therein. It is preferable that the polymeric materials, in particular when used as an electrode material, have an electric conductivity of as high as $10^{-3}$ S/cm or more.

Examples of ions capable of forming a complex together with the aforementioned electroconductive polymeric materials are ClO$_4^-$, PF$_6^-$, AsF$_6^-$, BF$_4^-$, CF$_3$SO$_3^-$, an anion of paratoluene sulfonic acid, an anion of nitrobenzene sulfonic acid, and a complex anion such as Fe(CN)$_6^-$ and Co(CN)$_6^-$.

For the negative electrode, a metal substrate made of, for example, nickel, aluminum, zinc and tin can be used, on which a reduced metal or alloy of a cation contained in the electrolytic solution is allowed to deposit. In particular, it is preferable that reduced metals or alloys of polyvalent metal cations in the electrolytic solution be used as the material of the metal substrate. For example, Al-Si, Al-Mg, Al-Mn, Zn and Sn are given as preferable examples.

Alternatively, alkali metals such as lithium and sodium, or alloys and mixtures thereof can be used as an active material for the negative electrode. In this case, it is preferable that the above-mentioned alloys and mixtures be made of alkali metals such as lithium and sodium and reduced metals of polyvalent metal cations dissolved in the electrolytic solution. Specific examples of the above alloys and mixtures of the alkali metals are Li-Al, Li-Zn, Li-Sn, Li-Mg, Li-Al-Mg, Li-Al-Zn and Li-Al-Sn.

Among the above listed materials for the negative electrode, lithium is preferable to obtain a secondary battery having a large energy capacity, high energy output, and high energy density. This is because lithium is light in weight and has high electric potential.

A lithium-type secondary battery, however, has the shortcoming that the cycle life thereof is short. This shortcoming is caused by the deposition of the reaction product of lithium and the electrolytic solution in the form of dendrite or moss on the negative electrode. To solve this problem, lithium-based alloys may be employed instead of lithium or the specific surface area of the negative electrode may be increased. As for the lithium-based alloys, aluminum is preferable for use as a counterpart metal of the alloy. When the lithium-aluminum type alloy is employed as a negative electrode material, it is preferable that the amount ratio of lithium to aluminum be up to 10 atom.% from the viewpoint of self-supporting properties and workability. From the standpoint of performance of a secondary battery, the lithium-aluminum type alloy having a $\beta$-phase, in which the amount ratio of lithium to aluminum is 50 to 50 atom.%, is preferable, but this lithium-aluminum alloy has difficulties in retaining the form of a self-supporting thin sheet. The negative electrode can be metallurgically and electrochemically prepared by the above lithium-aluminum alloy (50 : 50 atom.%). However, the workability of the above lithium-aluminum alloy is poor and the above-mentioned $\beta$-phase of the alloy is brittle and unstable, so that it is next to impossible to work it in a flexible thin sheet.

In the present invention, lithium is laminated on a substrate made of aluminum or an aluminum alloy by contact bonding or rolling and the thus obtained laminated material is heated to a predetermined temperature to obtain a sheet-shaped negative electrode in different sizes and shapes. In the case where the aluminum or aluminum alloy substrate is about twice or more as thick as the lithium layer, a sheet-shaped negative electrode in which only the surface is kept in a $\beta$-phase can be obtained. Alternatively, the lithium aluminum thin sheet having a thickness of 100 $\mu$m or less can be obtained by deposition of lithium on the aluminum (or aluminum alloy) substrate.

By increasing the specific surface area of the aluminum-based substrate, the specific surface area of a sheet-shaped alloy can be increased as a whole. This can allow the thus obtained secondary battery to carry out the charging-discharging operation of a large quantity of electric current.

Even though the negative electrode and the electrolytic solution have the superiorities to conventional ones independently, the obtained secondary battery does not necessarily show high performance. The compatibility of the negative electrode material with the employed electrolytic solution is important.

Figure 1:
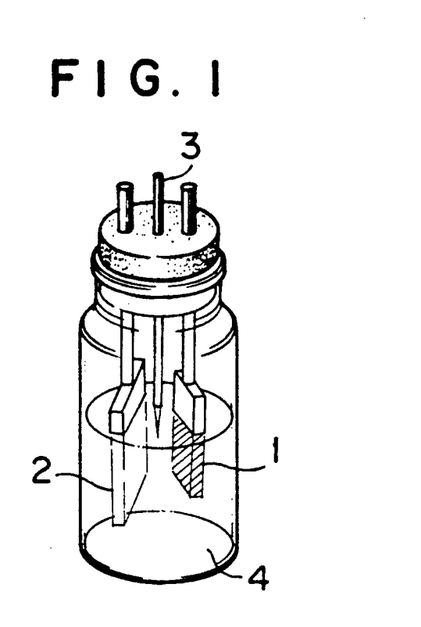
FIG. 1 is a schematic diagram of an experimental equipment for measuring the charging-discharging efficiency of secondary battery.

To evaluate the compatibilities of the lithium-aluminum based alloy serving as a negative electrode with various kinds of the electrolytic solution, the charging-discharging efficiency test was conducted in the following manner;

In a container as shown in FIG. 1, a 1-cm$^2$ Li-Al based alloy sheet 1 serving as a working electrode, a 3-cm$^2$ pure lithium sheet 2 serving as a counter electrode and a reference electrode 3 made of pure lithium were immersed in an electrolytic solution 4 prepared by dissolving each electrolyte into the solvent as listed in Table 1.

Figure 2:
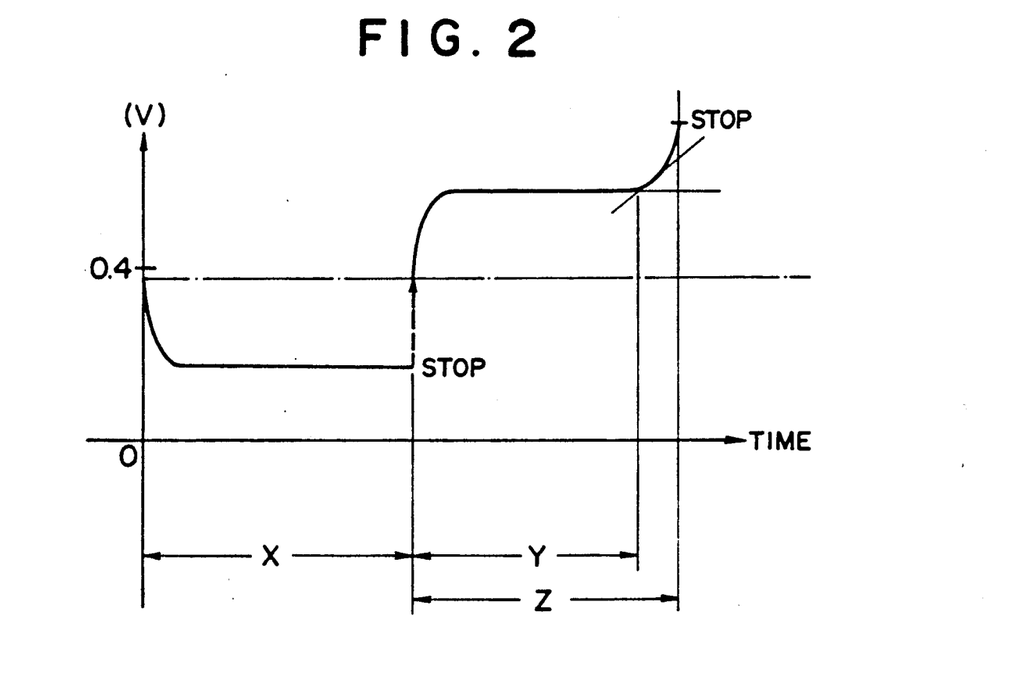
FIG. 2 is a graph in explanation of a charging-discharging efficiency test.

A constant electric current of $-1.0$ mA/cm$^2$ was applied to the working electrode 1 for 1.5 hours for charging. Then, an electric current of 1.0 mA/cm$^2$ was allowed to release from the working electrode 1 over a period of 1.5 hours for discharging. The difference in potential between the working electrode 1 and the reference electrode 3 during the charging and discharging process is indicated by the graph shown in FIG. 2. In FIG. 2, X and Z indicate a charging time (1.5 h) and a discharging time (1.5 h), respectively.

At the initial stage prior to the charging process, the potential of the working electrode (Li-Al based alloy) relative to the reference electrode 3 is about 0.4 V. In the course of the charging process, the potential of the working electrode 1 is substantially constant as shown in FIG. 2.

During the discharging operation the difference in potential between the working electrode 1 and the reference electrode 3 is also constant for a while and then suddenly increased. Y indicates a period of time in which the difference in potential between the two electrodes 1 and 3 is substantially constant during the discharging operation. The charging-discharging efficiency is expressed by the following formula:

$$\text{Charging-discharging efficiency (\%)} = \frac{Y}{X} \times 100$$

If lithium is used, it reacts with the electrolytic solution during the charging operation and the reaction product is deposited on the negative electrode, so that it is considered that the charging-discharging efficiency will be decreased. The results are given in Table 1.

TABLE 1

| Electrolyte | Solvent of Electrolytic Solution | Charging-discharging Efficiency (%) |
|---|---|---|
| LiClO$_4$ | PC/DME/EME (7:2:1) | 88.0 |
| LiClO$_4$ | γ-BL/EME/DME (7:2:1) | 84.4 |
| LiPF$_6$ | γ-BL/EME (8:2) | 81.5 |
| LiPF$_6$ | PC/EME/DME (6:2:2) | 73.9 |
| LiBF$_4$ | PC/DME/BZ (5:4:1) | 71.2 |
| LiBF$_4$ | γ-BL/DME/EME (6:2:2) | 60.3 |
| CF$_3$SO$_3$Li | PC/DME/EME (6:2:2) | 91.3 |
| CF$_3$SO$_3$Li | γ-BL/EME/DME (7:2:1) | 94.7 |

PC: Polypylene carbonate
DME: 1,2-dimethoxy ethane (glyme)
EME: 1,2-ethoxy methoxy ethane (glyme)
γ-BL: γ-butyrolactone
BZ: Benzene As is apparent from the results shown in Table 1, when CF$_3$SO$_3$Li was employed as an electrolyte, the charging-discharging efficiency was excellent regardless of the types of the solvent of the electrolytic solution. In particular, the combination of CF$_3$SO$_3$Li and a mixed solvent of γ-butyrolactone and glymes resulted in the high charging-discharging efficiency.

Furthermore, the repeated operations of doping and dedoping of a lithium ion were carried out by using pure lithium. As a result, when CF$_3$SO$_3$Li was employed as an electrolyte, the amount of the deposition in the form of dendrite or moss on the electrode was 1/10 or less as compared with other electrolytes. Accordingly, the electrolyte of CF$_3$SO$_3$Li is optimal when a lithium-aluminum type alloy is used as a negative electrode material.

As previously mentioned, various electroconductive or semiconductive polymeric materials can be used as a positive electrode active material in the present invention. In particular, polyaniline is preferable among the previously listed polymeric materials. This is because the polymer of polyaniline has fibrous morphology, which contributes to increasing the surface area per unit area or unit weight. Polyaniline is capable of conducting a large-scale doping constantly, which enables the positive electrode to achieve a charging-discharging operation of a large quantity of electric current.

The above-mentioned polyaniline can be prepared by electrolytic polymerization or chemical polymerization. A sheet-shaped positive electrode can be obtained by coating a stainless steel mesh serving as a collector with a mixture of polyaniline prepared by chemical polymerization and a binder agent. More preferably, polyaniline may be polymerized directly on the stainless steel mesh by the electrochemical polymerization method. The latter procedure can form an integral positive electrode, which decreases the internal impedance.

To improve the adhesion between the above-mentioned stainless steel mesh and polyaniline and the flexibility of the positive electrode, minute pores may be provided on the stainless steel mesh and the stainless steel mesh may be then subjected to blast finishing before polymerization of polyaniline.

The combination of the polymeric material for the positive electrode and the electrolytic solution is also a key point to obtain a high performance secondary battery.

The matching properties between the polymeric active material for the positive electrode and the electrolytic solution were evaluated by cyclic voltammogram. In this measurement, CF$_3$SO$_3$Li, which was proved to match well with various negative electrodes, was used as an electrolyte of the electrolytic solution. The results are shown in Table 2.

TABLE 2

| Electroconductive Polymeric Material | Solvent of Electrolytic Solution | Results of C. Voltammogram |
|---|---|---|
| Polyaniline | PC/DME (7:3) | 1.0 |
| Polyaniline | γ-BL/DME/EME (7:1:2) | 4.8 |
| Polyaniline | γ-BL/DME/EME (6:1:3) | 4.7 |
| Polypyrrole | PC/DME (7:3) | 1.0 |
| Polypyrrole | PC/DME/EME (5:3:2) | 2.9 |
| Polypyrrole | γ-BL/DME/EME (8:1:1) | 4.9 |
| Polypyrrole | γ-BL/DME/EME (7:1:2) | 4.7 |
| Polythiophene | PC/DME (7:3) | 1.0 |
| Polythiophene | γ-BL/DME/EME (6:2:2) | 3.3 |

TABLE 2-continued

| Electroconductive Polymeric Material | Solvent of Electrolytic Solution | Results of C. Voltammogram |
|---|---|---|
| Polythiophene | γ-BL/EME (7:3) | 3.1 |
| Polythiophene | γ-BL/DME/EME (8:1:1) | 3.9 |

*The concentration of the electrolyte is 3 mol/l.

As can be seen from Table 2, the electrolytic solution for use in the present invention, which comprises a mixed solvent of γ-butyrolactone and a glyme, matches well with any of the electroconductive polymeric materials.

Since the specific surface area of both positive and negative electrodes for use in the present invention can be increased and those electrodes are sufficiently flexible to prepare in a sheet-shaped form, the surface area of the electrodes is easily increased and the obtained battery can be thus provided with a large energy capacity.

As previously mentioned, the positive and negative electrodes can be prepared in a sheet-shaped form, so that a sheet-shape secondary battery according to the present invention can be realized. In the sheet-shaped secondary batteries according to the present invention, the combination of (i) the above-mentioned electroconductive polymeric active material in the form of a sheet for the positive electrode, (ii) a sheet-shaped lithium negative electrode, and (iii) an electrolytic solution comprising a mixed solvent of γ-butyrolactone and a glyme is preferable. More preferably, the sheet-shaped lithium negative electrode may be replaced by the sheet-shaped lithium-aluminum alloy based negative electrode in the above combination, so that the cycle life of a sheet-shaped secondary battery is prolonged.

Furthermore, in the sheet-shaped secondary battery according to the present invention, a separator impregnated with the electrolytic solution for use in the present invention can be provided between the two electrodes.

As a separator, materials having a low resistance to the ion transfer in the electrolytic solution and outstanding retentivity of an electrolytic solution are usable in the present invention. For example, a glass fiber filter; a polymeric porefilter such as polyester, Teflon, Polyflon and polypropylene; nonwoven fabrics; or nonwoven fabrics made of glass fiber and the above polymers are employable.

Instead of the above separator impregnated with the electrolytic solution, or in addition to this, a solid electrolyte may be employed in the present invention. Examples of the inorganic solid electrolytes are halogenated metals such as AgCl, AgBr, AgI and LiI; and RbAg$_4$I$_5$ and RbAg$_4$I$_4$CN. Examples of the organic solid electrolytes include a composite prepared by dissolving the above-mentioned electrolytic salt into a polymer matrix such as polyethylene oxide, polypropylene oxide, polyvinylidene fluoride and polyacrylonitrile; a cross-linked polymeric solid electrolyte prepared by cross linking the above polymer matrix; and polymeric electrolytes having ion dissociated group such as low molecular weight polyethylene oxide, polyethyleneimine and crown ether in a main chain of the polymer by means of graft polymerization. Alternatively, a solid electrolyte can be prepared by adding a polymerizable material to an electrolytic solution comprising a solvent and an electrolytic salt to solidify. From the viewpoints of the resistance to solution leakage, ion conductivity and stabilities of materials, the solid electrolyte obtained by the latter method are preferable.

Other features of this invention will become apparent in the course of the following description of exemplary embodiments, which are given for illustration of the invention and are not intended to be limiting thereof.

EXAMPLES

Positive Electrode Preparation Example 1

Using a polymerizing solution prepared by dissolving 0.5 M aniline into 1.5 N H$_2$SO$_4$, electrochemical polymerization was conducted by applying a constant electric potential of 0.75 V vs SCE, whereby a polyaniline film having a thickness of 30 μm was deposited on the surface of ITO (Indium Tin Oxide) glass. Thus, a sheet-shaped positive electrode No. 1 for use in the present invention was prepared.

Positive Electrode Preparation Example 2

Using a polymerizing solution prepared by dissolving 0.1 M pyrrole and 0.05 M sodium paratoluene sulfonate into acetonitrile, electrochemical polymerization was conducted by applying a constant voltage of 5 V, whereby a polypyrrole film having a thickness of 20 μm was deposited on the surface of ITO glass. Thus, a sheet-shaped positive electrode No. 2 for use in the present invention was prepared.

Positive Electrode Preparation Example 3

Using a polymerizing solution prepared by dissolving 4 mM diphenylbenzidlne and 0.1 M ammonium perchloric tetrabutylate into aceatonitrile with addition thereto of 0.05 M lutidine, electrochemical polymerization was conducted by applying a constant electric potential of 1.2 V vs SCE, whereby a polydiphenylbenzidine film having a thickness of 20 μm was deposited on the surface of ITO glass. Thus, a sheet-shaped positive electrode No. 3 for use in the present invention was prepared.

EXAMPLE 1

Figure 3:
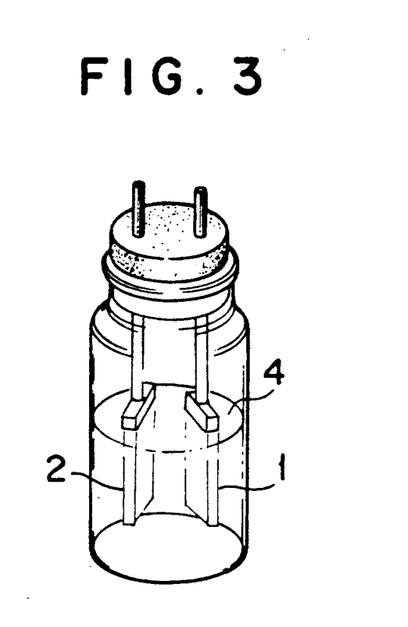
FIG. 3 is a schematic illustration of an embodiment of a secondary battery according to the present invention prepared in Example 1.

LiBF$_4$ was dissolved in a solvent which was prepared by mixing γ-butyrolactone and 1,2-ethoxy methoxy ethane at a ratio of 50:50 (vol%), so that an electrolytic solution was obtained. As shown in FIG. 3, the above prepared electrolytic solution was placed in a container. The positive electrode No. 1 (2.5 cm×3 cm) prepared in Positive Electrode Preparation Example 1 and a negative electrode (2.5 cm×3 cm) made of Li were immersed into the electrolytic solution. The electrolyte LiBF$_4$ was dissolved in the solvent in an amount of 3.7 mmol per gram of the polyaniline serving as the positive electrode active material. Thus, secondary battery No. 1 according to the present invention was prepared.

The thus prepared secondary battery No. 1 was subjected to a charging-discharging test by applying a constant current of 0.1 mA/cm$^2$.

The energy capacity was measured at the 20th cycle and 150th cycle.

The results are given in Table 3-1.

EXAMPLES 2–6

The procedure for preparing the secondary battery No. 1 as employed in Example 1 was repeated except that each of the positive electrode active material, the material for a negative electrode, the solvent and the electrolyte of the electrolytic solution was replaced as shown in Table 3, so that secondary batteries No. 2 to No. 6 according to the present invention were prepared. Each of the negative electrodes comprising Li and Al employed in Examples 2 to 6 was prepared by superimposing a lithium film on an aluminum substrate, each having a thickness as shown in Table 3-1, with application of pressure thereto, and subjecting the composite Li/Al film to heat treatment.

The thus obtained secondary batteries No. 2 to No. 6 were subjected to the same charging-discharging test as employed in Example 1.

The results are also given in Table 3.

Comparative Example 1

LiBF$_4$ was dissolved in γ-butyrolactone, so that an electrolytic solution was obtained. As shown in FIG. 3, the above prepared electrolytic solution was placed in a container.

The positive electrode No. 1 (2.5 cm×3 cm) prepared in Positive Electrode Preparation Example 1 and a negative electrode (2.5 cm×3 cm) made of Li were immersed into the electrolytic solution. The electrolyte LiBF$_4$ was dissolved in the solvent in an amount of 3.7 mmol per gram of the polyaniline serving as the positive electrode active material. Thus, comparative secondary battery No. 1 was prepared.

The thus prepared comparative secondary battery No. 1 was subjected to the same charging-discharging test as employed in Example 1.

The energy capacity was measured at the 20th cycle and 150th cycle.

The results are given in Table 3-2.

Comparative Examples 2-6

The procedure for Example 1 was repeated except that each of the positive electrode active material, the material for a negative electrode, the solvent of the electrolytic solution and the electrolyte was replaced as shown in Table 3, so that comparative secondary batteries No. 2 to No. 6 were prepared. As in Examples 2 to 6, each of the negative electrodes comprising Li and Al employed in Comparative Examples 2 to 6 was prepared by superimposing a lithium film on an aluminum substrate, each having a thickness as shown in Table 3-2, with application of pressure thereto and subjecting the composite Li/Al film to heat treatment.

The thus obtained comparative secondary batteries No. 2 to No. 6 were subjected to the same charging-discharging test as employed in Example 1.

The results are also given in Table 3-2.

TABLE 3-1

| | Examples | | | | | |
|---|---|---|---|---|---|---|
| | 1 | 2 | 3 | 4 | 5 | 6 |
| Polymeric Active Material for Positive Electrode | Polyaniline | Polyaniline | Polyaniline | Polyaniline | Polypyrrole | Polydiphenyl-benzidine |
| Negative Electrode (*) | Li | Li (100) Al (300) | Li (100) Al (300) | Li (50) Al (100) | Li (50) Al (100) | Li (100) Al (300) |
| Solvent of (**) Electrolytic Solution | γ-BL:EME (5:5 Vol. %) | γ-BL:DME (5:5) | γ-BL:EME:DME (7:2:1) | γ-BL:EME (8:2) | γ-BL:EME:DME (7:2:1) | γ-BL:EME:DME (6:2:2) |
| Electrolyte (***) | LiBF$_4$ | LiBF$_4$ | CF$_3$SO$_3$Li | CF$_3$SO$_3$Li | CF$_3$SO$_3$Li | CF$_3$SO$_3$Li |
| Energy 20th cycle Capacity 150th cycle (mAh/g) | 144 144 | 130.5 131.0 | 124 120 | 119 115 | 83 74 | 98 92 |
| Short-circuit Current (mA/cm$^2$) | 9.7 | 10.0 | 8.8 | 8.2 | 5.0 | 4.9 |
| Note | | | | | | |

(*) The figures in parentheses indicate the thickness (μm) of each negative electrode.
(**) γ-BL: γ-butyrolactone
  EME: 1,2-ethoxy methoxy ethane
  DME: 1,2-dimethoxy ethane
  PC: propylene carbonate
  BC: butylene carbonate
  DEE: 1,2-diethoxy ethane
  BZ: benzene
(***) The amount of the electrolyte was 3.7 mmol per gram of the polymeric active material for positive electrode.

TABLE 3-2

| | Comparative Examples | | | | | |
|---|---|---|---|---|---|---|
| | 1 | 2 | 3 | 4 | 5 | 6 |
| Polymeric Active Material for Positive Electrode | Polyaniline | Polyaniline | Polyaniline | Polyaniline | Polypyrrole | Polydiphenyl-benzidine |
| Negative Electrode (*) | Li | Li (100) Al (300) | Li (100) Al (300) | Li (50) Al (100) | Li (50) Al (100) | Li (100) Al (300) |
| Solvent of (**) Electrolytic Solution | γ-BL | γ-BL:EME (9:1) | PC:DME (7:3) | BC:DEE (7:3) | PC:DME (6:4) | BC:EME (7:3) |
| Electrolyte (***) | LiBF$_4$ | LiBF$_4$ | CF$_3$SO$_3$Li | LiBF$_4$ | LiBF$_4$ | LiBF$_4$ |
| Energy 20th cycle Capacity 150th cycle (mAh/g) | 104.7 98.8 | 103.5 91.7 | 40.8 40.0 | 107.5 99.9 | 69.0 61.8 | 82.8 69.8 |
| Short-circuit Current (mA/cm$^2$) | 5.2 | 5.9 | 7.3 | 6.8 | 3.9 | 3.2 |
| Note | Electrolytic solution was colored. | Electrolytic solution contained | | | | |

TABLE 3-2-continued

| | Comparative Examples | | | | | |
|---|---|---|---|---|---|---|
| | 1 | 2 | 3 | 4 | 5 | 6 |
| | insoluble and set to gel. | | | | | |

Positive Electrode Preparation Example 4

A stainless steel foil having a thickness of 20 μm was subjected to chemical etching to form pores with a diameter of 100 μm with a distribution of 100 pores/cm² and then subjected to blast finishing to roughen the surface of the stainless steel foil.

Using the above prepared stainless steel foil as a collector and a polymerizing solution prepared by dissolving 0.5 M aniline into 1.5 N $H_2SO_4$, electrochemical polymerization was conducted by applying a constant electric potential of 0.75 V vs SCE, whereby a polyaniline film polymerized with a polymerization charge of 12 C/cm² was deposited on both sides of the stainless steel foil. Thus, a sheet-shaped positive electrode No. 4 for use in the present invention was prepared.

Positive Electrode Preparation Example 5

A stainless steel foil having a thickness of 20 μm was subjected to chemical etching to form pores with a diameter of 100 μm with a distribution of 100 pores/cm² and then subjected to blast finishing to roughen the surface of the stainless steel foil.

Using the above prepared stainless steel foil as a collector and a polymerizing solution prepared by dissolving 0.1 M pyrrole and 0.05 M sodium paratoluene sulfonate into acetonitrile, electrochemical polymerization was conducted by applying a constant voltage of 5 V, whereby a polypyrrol film polymerized with a polymerization charge of 8 C/cm² was deposited on both sides of the stainless steel foil. Thus, a sheet-shaped positive electrode No. 5 for use in the present invention was prepared.

Positive Electrode Preparation Example 6

A stainless steel foil having a thickness of 20 μm was subjected to chemical etching to form pores with a diameter of 100 μm with a distribution of 100 pores/cm² and then subjected to blast finishing to roughen the surface of the stainless steel foil.

Using the above prepared stainless steel foil as a collector and a polymerizing solution prepared by dissolving 4 mM diphenylbenzidine and 0.1 M ammonium perchloric tetrabutylate into aceatonitrile with addition thereto of 0.05 M lutidine, electrochemical polymerization was conducted by applying a constant electric potential of 1.2 V vs SCE, whereby a polydiphenylbenzidine film polymerized with a polymerization charge of 8 C/cm² was deposited on both sides of the stainless steel foil. Thus, a sheet-shaped positive electrode No. 6 for use in the present invention was prepared.

EXAMPLE 7

Preparation of Electrolytic Solution $CF_3SO_3Li$ was dissolved in a solvent which was prepared by mixing γ-butyrolactone, 1,2-ethoxy methoxy ethane and 1,2-dimethoxy ethane at a ratio of 70:20:10 (vol%), so that an electrolytic solution was obtained.

Preparation of Negative Electrode

Figure 4:
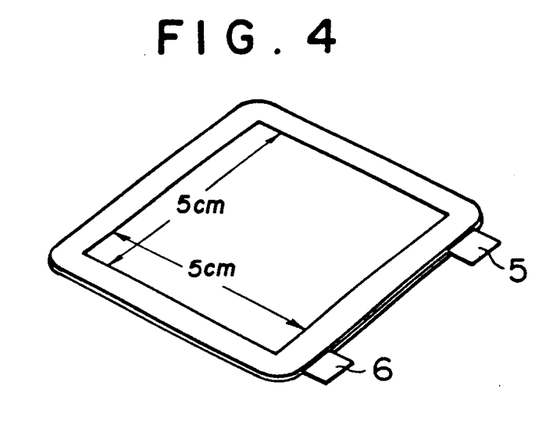
FIG. 4 is a schematic illustration of another embodiment of a secondary battery according to the present invention prepared in Example 7.

A lithium film having a thickness of 50 μm was laminated on an aluminum substrate having a thickness of 100 μm by contact bonding. The thus laminated composite material was subjected to heat treatment, whereby a negative electrode was obtained. A portion of the aluminum substrate, indicated by reference numeral 5 in FIG. 4 which was not covered with the lithium film, served as a negative electrode terminal. In FIG. 4, reference numeral 6 indicates a positive electrode terminal.

Figure 5:
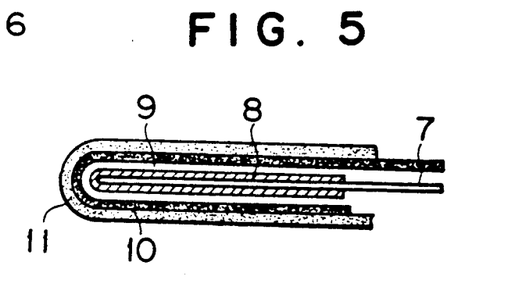
FIG. 5 is a cross-sectional view of the secondary battery shown in FIG. 4.

As shown in FIG. 5, the positive electrode No. 4 which was prepared by polymerizing the electroconductive polymeric material (polyaniline) 8 on both sides of the stainless steel collector 7 in Positive Electrode Preparation Example 4, a sheet of nonwoven fabric of polypropylene serving as a separator 9 and the above prepared Li-Al negative electrode 10 were laminated and the thus laminated material was covered with an external cover 11. A tip portion of the collector 7 in FIG. 5 corresponds to the positive electrode terminal 6 in FIG. 4. The separator 9 was then impregnated with the above prepared electrolytic solution, so that sheet-shaped secondary battery No. 7 (5 cm × 5 cm) according to the present invention was obtained.

The thus prepared secondary battery No. 7 was subjected to a charging-discharging test by applying a constant current of 10 mA (0.4 mA/cm²).

The energy capacity was measured at the 20th cycle and 150th cycle. In addition to this, the short-circuit current was measured.

The results are given in Table 4-1.

EXAMPLES 8–11

The procedure for preparing the sheet-shaped secondary battery No. 7 as employed in Example 7 was repeated except that each of the positive electrode active material, the material for the negative electrode, the solvent and the electrolyte of the electrolytic solution was replaced as shown in Table 4-1, so that sheet-shaped secondary batteries No. 8 to No. 11 according to the present invention were prepared.

The thus obtained sheet-shaped secondary batteries No. 8 to No. 11 were subjected to the same charging-discharging test as employed in Example 7.

The energy capacity was measured at the 20th cycle and 150th cycle. In addition to this, the short-circuit current was measured.

The results are also given in Table 4-1.

EXAMPLE 12

The procedure for preparing the sheet-shaped secondary battery No. 7 as employed in Example 7 was repeated except that the thickness of the material for the negative electrode, the solvent of the electrolytic solution and the amount of the electrolyte to the polymeric active material for the positive electrode were changed as shown in Table 4-1, so that sheet-shaped secondary battery No. 12 according to the present invention were prepared.

The thus obtained sheet-shaped secondary battery No. 12 was subjected to a charging-discharging test by applying a constant current of 20 mA.

The energy capacity was measured at the 20th cycle and 150th cycle. In addition to this, the short-circuit current was measured.

The results are also given in Table 4-1.

EXAMPLE 13

The procedure for preparing the sheet-shaped secondary battery No. 7 according to the present invention as employed in Example 7 was repeated except that the amount of the electrolyte to the polymeric active material for the positive electrode was changed from 5.1 mmol/g to 3.9 mmol/g, and that the preparation of the negative electrode was changed as follows, so that sheet-shaped secondary battery No. 13 according to the present invention was obtained.

Preparation of Negative Electrode

An aluminum substrate having a thickness of 300 μm was subjected to etching to make the surface thereof rough.

A lithium film having a thickness of 100 μm was laminated on the above aluminum substrate by contact bonding. The thus laminated composite material was subjected to heat treatment, whereby a negative electrode was obtained. A portion of the aluminum substrate, indicated by reference numeral 5 in FIG. 4, which was not covered with the lithium film, served as a negative electrode terminal. In FIG. 4, reference numeral 6 indicates a positive electrode terminal.

EXAMPLE 14

Figure 6:
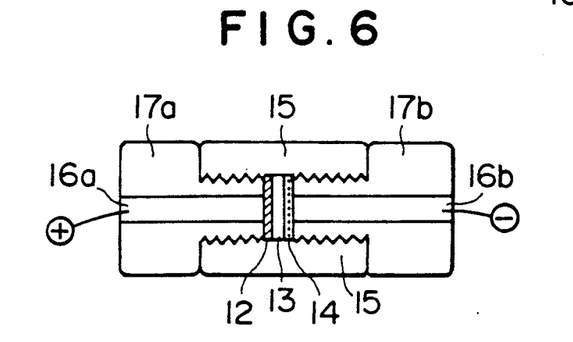
FIG. 6 is a cross-sectional view of a further embodiment of a secondary battery according to the present invention prepared in Example 14.
Figure 7:
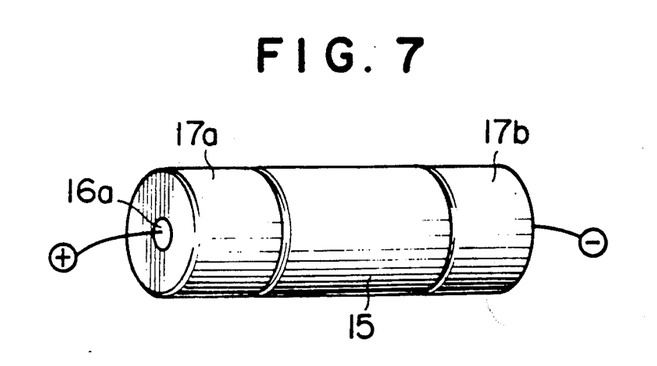
FIG. 7 is a schematic diagram showing an appearance of the secondary battery shown in FIG. 6.

A secondary battery with a cylindrical structure as illustrated in FIGS. 6 and 7 was fabricated.

In the figures, reference numeral 12 indicates a disc-shaped positive electrode having a diameter of 16 mm, made of the same material as in the positive electrode in Example 7. Reference numeral 14 indicates a disc-shaped negative electrode having a diameter of 16 mm, which is made of the same material as in the positive electrode in Example 7. Between the positive electrode 12 and the negative electrode 14 is interposed a separator 13, which is impregnated with an electrolytic solution as prepared below:

Preparation of Electrolytic Solution $LiBF_4$ was dissolved in a solvent which was prepared by mixing γ-butyrolactone and 1,2-dimethoxy ethane at a ratio of 50:50 (vol%), so that an electrolytic solution was obtained.

As shown in FIG. 6, the negative electrode 12, the separator 13 and the positive electrode 14 are fitted in a cylinder made of Teflon. The positive electrode 12 is connected to a stainless rod 16a embedded in a screw 17a made of Teflon. In the same manner, the negative electrode 12 is connected to a stainless rod 16b embedded in a counterpart screw 17b made of Teflon. By turning both screws 17a and 17b, the negative electrode 12, the separator 13 and the positive electrode 14 can be tightly secured.

Thus, secondary battery No. 14 according to the present invention was prepared as shown in FIG. 7.

The thus prepared secondary battery No. 14 was subjected to a charging-discharging test by applying a constant current of 0.4 mA.

The energy capacity was measured at the 20th cycle and 150th cycle. In addition to this, the short-circuit current was measured.

The results are given in Table 4-2.

EXAMPLE 15

The procedure for preparing the secondary battery No. 14 as employed in Example 14 was repeated except that the amount of the electrolyte to the polymeric active material for the positive electrode was changed from 4.8 mmol/g to 4.0 mmol/g, so that secondary battery No. 15 according to the present invention was prepared.

The thus prepared secondary battery No. 15 was subjected to a charging-discharging test by applying a constant current of 0.4 mA.

The energy capacity was measured at the 20th cycle and 150th cycle. In addition to this, the short-circuit current was measured.

The results are given in Table 4-2.

TABLE 4-1

| | Examples | | | | | |
|---|---|---|---|---|---|---|
| | 7 | 8 | 9 | 10 | 11 | 12 |
| Polymeric Active Material for Positive Electrode | Polyaniline | Polyaniline | Polyaniline | Polypyrrole | Polydiphenyl-benzidine | Polyaniline |
| Negative Electrode (*) | Li (50) Al (100) | Li (45) Al (80) | Li (45) Al (80) | Li (50) Al (80) | Li (50) Al (80) | Li (100) (Al 300) |
| Solvent of Electrolytic Electrolyte (**) | γ-BL:EME:DME (7:2:1 vol %) $CF_3SO_3Li$ (5.1) | γ-BL:DME (8:2) $CF_3SO_3Li$ (5.0) | γ-BL:DME (7:3) $CF_3SO_3Li$ (4.8) | γ-BL:EME:DME (7:2:1) $CF_3SO_3Li$ (4.5) | γ-BL:EME:DME (6:2:2) $CF_3SO_3Li$ (4.8) | γ-BL:EME (7:3) $CF_3SO_3Li$ (4.2) |
| Energy Capacity (mAh/g) 20th cycle | 118.3 | 110.0 | 108 | 103.3 | 100.0 | 63.0 |
| 150th cycle | 107.5 | 101.1 | 102.3 | 98.7 | 89.5 | 51.2 |
| Short-circuit Current (mA/cm²) | 7.8 | 6.9 | 9.3 | 4.3 | 4.7 | 7.1 |

(*) The figures in parentheses indicate the thickness (μm) of each negative electrode.
(**) The figures in parentheses indicate the amount of the electrolyte per gram of the polymeric active material for positive electrode.

TABLE 4-2

| | Examples | | |
|---|---|---|---|
| | 13 | 14 | 15 |
| Polymeric Active Material for Positive Electrode | Polyaniline | Polyaniline | Polyaniline |

TABLE 4-2-continued

|  | Examples | | |
|---|---|---|---|
|  | 13 | 14 | 15 |
| Negative Electrode (*) | Li (100) | Li (50) | Li (50) |
|  | Al (300) | Al (100) | Al (100) |
| Solvent of Electrolytic Solution | γBL:EME:DME (7:2:1) | γ-BL:DME (5:5) | γ-BL:DME (5:5) |
| Electrolyte (**) | $CF_3SO_3Li$ (3.9) | $LiBF_4$ (4.8) | $LiBF_4$ (4.0) |
| Energy 20th cycle | 104.0 | 115.8 | 100.3 |
| Capacity 150th cycle (mAh/g) | 98.7 | 113.0 | 97.5 |
| Short-circuit Current (mA/cm$^2$) | 6.8 | 3.4 | 8.9 |

COMPARATIVE EXAMPLES 7–11

The procedure for preparing the sheet-shaped secondary battery No. 7 according to the present invention as employed in Example 7 was repeated except that each of the positive electrode active material, the material for the negative electrode, the solvent and the electrolyte of the electrolytic solution was replaced as shown in Table 5, so that comparative sheet-shaped secondary batteries No. 7 to No. 11 were prepared.

The thus obtained comparative sheet-shaped secondary batteries No. 7 to No. 11 were subjected to the same charging-discharging test as employed in Example 7.

The results are also given in Table 5.

COMPARATIVE EXAMPLE 12

The procedure for preparing the secondary battery No. 14 according to the present invention as employed in Example 14 was repeated except that the thickness of the material for the negative electrode, the solvent of the electrolytic solution and the amount of the electrolyte to the polymeric active material for the positive electrode were changed as shown in Table 5, so that comparative secondary battery No. 12 was prepared.

The thus prepared comparative secondary battery No. 12 was subjected to a charging-discharging test by applying a constant current of 0.4 mA.

After the repeated operation of charging and discharging, the electrolytic solution was colored. The energy capacity was measured at the 20th cycle and 150th cycle. In addition to this, the short-circuit current was measured.

The results are given in Table 5.

COMPARATIVE EXAMPLE 13

The procedure for preparing the secondary battery No. 14 according to the present invention as employed in Example 14 was repeated except that the solvent and the electrolyte of the electrolytic solution and the amount of the electrolyte to the polymeric active material for the positive electrode were changed as shown in Table 5, so that comparative secondary battery No. 13 was prepared.

The thus prepared comparative secondary battery No. 13 was subjected to a charging-discharging test by applying a constant current of 0.4 mA.

After the repeated operation of charging and discharging, the electrolytic solution became gel. The energy capacity was measured at the 20th cycle and 150th cycle. In addition to this, the short-circuit current was measured.

The results are given in Table 5.

TABLE 5

|  | Comparative Example | | | | | | |
|---|---|---|---|---|---|---|---|
|  | 7 | 8 | 9 | 10 | 11 | 12 | 13 |
| Plymeric Active Material for Positive Electrode | Polyaniline | Polyaniline | Polyaniline | Polypyrrole | Polydiphenyl-benzidine | Polyaniline | Polyaniline |
| Negative Electrode (*) | Li (50) | Li (45) | Li (45) | Li (50) | Li (50) | Li (100) | Li (50) |
|  | Al (100) | Al (80) | Al (80) | Al (80) | Al (80) | Al (300) | Al (100) |
| Solvent of Electrolytic Solution | PC:DME (7:3 vol. %) | γ-BL | γ-BL:EME:DME (7:2:1) | PC:DEE:EME (6:2:2) | BC:EME:DME (7:2:1) | γ-BL | γ-BL:EME (9:1) |
| Electrolyte (**) | $CF_3SO_3Li$ (5.2) | $CF_3SO_3Li$ (5.0) | $LiBF_4$ (2.5) | $LiBF_4$ (4.5) | $LiBF_4$ (4.5) | $LiBF_4$ (2.8) | $LiBF_4$ (10.0) |
| Energy 20th cycle | 60.0 | 98.0 | 87.0 | 71.0 | 82.0 | 74.0 | 72.8 |
| Capacity 150th cycle (mAh/g) | 48.0 | 60.0 | 81.0 | 45.0 | 51.0 | — | 60.1 |
| Short-circuit Current (mA/cm$^2$) | 6.7 | 6.0 | 7.3 | 3.8 | 2.8 | 4.9 | 4.2 |
| Note |  |  |  |  |  | Electrolytic solution was colored. | Electrolytic solution set to gel. |

(*) The figures in parentheses indicate the thickness (μm) of each negative electrode.
(**) The figures in parentheses indicate the amount of the electrolyte per gram of the polymeric active material for positive electrode.

As previously mentioned, according to the present invention, a light secondary battery which has a high energy capacity and an increased energy density can be realized.

What is claimed is:

1. A secondary batter comprising (i) an electro-conductive or semiconductive polymeric material serving as an active material for a positive electrode, (ii) a negative electrode active material and (iii) an electrolyte including a solid electrolyte or an electrolytic solution comprising an electrolyte and a mixed solution of γ-butyrolactone and a glyme, wherein the mixing ratio of said glyme to said γ-butyrolactone is in the range of 20 to 80 vol.%; and wherein the amount of said electrolyte is 3 mmol or more per gram of said electro-conductive or semiconductive polymeric material.

2. The secondary battery as claimed in claim 1, wherein said glyme has an unsymmetrical structure represented by the following formula:

$$R^1O-(CH_2CH_2O)_n-R^2$$

wherein $R^1$ and $R^2$ each represent a different alkyl group having 1 to 4 carbon atoms; and n is an integer of 1 to 7.

3. The secondary battery as claimed in claim 1, wherein said glyme is selected from the group consisting of 1,2-dimethoxy ethane, diethylene glycol methyl ether, triethylene glycol dimethyl ether, 1,2-ethoxy methoxy ethane, 1,2-dimethoxy ethane and tetraethylene glycol dimethyl ether.

4. The secondary battery as claimed in claim 3, wherein said glyme is 1,2-ethoxy methoxy ethane.

5. The secondary battery as claimed in claim 1, wherein said electrolyte is selected from the group consisting of $LiBF_4$, $LiAsF_6$, $CF_3SO_3Li$, $LiSbF_6$, $LiPF_6$, $LiClO_4$, $Mg(ClO_4)_2$ and $NaClO_4$.

6. The secondary battery as claimed in claim 5, wherein said electrolyte is $CF_3SO_3Li$.

7. The secondary battery as claimed in claim 1, wherein said electroconductive o semiconductive polymeric material serving as an active material for a positive electrode has an electric conductivity of $10^{-3}$ S/cm or more.

8. The secondary battery as claimed in claim 1, wherein said electroconductive or semiconductive polymeric material serving as said active material for said positive electrode is prepared by electrochemical polymerization of a monomer selected from the group consisting of pyrrole, thiophene, furan, benzene, azulene, aniline, diphenylbenzidine, diphenylamine, triphenylamine and derivatives thereof.

9. The secondary battery as claimed in claim 1, wherein said electroconductive or semiconductive polymeric material serving as said active material for said positive electrode is polyaniline.

10. The secondary battery as claimed in claim 8, wherein said electroconductive or semiconductive polymeric material is prepared by electrochemical polymerization of said monomer directly on a collector.

11. The secondary battery as claimed in claim 10, wherein said collector is blasted.

12. The secondary battery as claimed in claim 1, wherein said positive electrode is in the form of a flexible sheet.

13. The secondary battery as claimed in claim 1, wherein said negative electrode active material is lithium.

14. The secondary battery as claimed in claim 13, wherein said negative electrode active material comprises an aluminum substrate and a lithium layer laminated on said aluminum substrate.

15. The secondary battery as claimed in claim 14, wherein an amount ratio of said aluminum to lithium is 50 to 50 atom.%.

16. The secondary battery as claimed in claim 14, wherein said aluminum substrate is subjected to etching to make the surface thereof rough.

17. The secondary battery as claimed in claim 1, wherein said negative electrode active material is in the form of a flexible sheet.

18. The secondary battery as claimed in claim 1, further comprising a separator between said positive electrode and said negative electrode.

19. The secondary battery as claimed in claim 1, wherein said electrolyte is a solid electrolyte.

20. The secondary battery as claimed in claim 1, which is in the form of a flexible sheet.

* * * * *